United States Patent
Yang

(10) Patent No.: US 6,423,171 B1
(45) Date of Patent: Jul. 23, 2002

(54) KEYPAD FOR PORTABLE TELEPHONE AND MANUFACTURING METHOD THEREOF

(75) Inventor: Yoon-Hong Yang, Seoul (KR)

(73) Assignee: You Eal Electronics Co., Ltd., Seoul (KR)

(*) Notice: Subject to any disclaimer, the term of this patent is extended or adjusted under 35 U.S.C. 154(b) by 0 days.

(21) Appl. No.: 09/470,272

(22) Filed: Dec. 22, 1999

(30) Foreign Application Priority Data

Dec. 31, 1998 (KR) .............................. 98-63310
Oct. 29, 1999 (KR) .............................. 99-47619

(51) Int. Cl.[7] .............. B32B 31/00; B31F 1/00; H04M 9/00
(52) U.S. Cl. .............. 156/245; 156/256; 156/267; 156/277; 200/512; 200/514; 379/422
(58) Field of Search ................ 156/277, 242, 156/245, 256, 267, 297; 200/512, 514; 264/132, 135, 153, 155, 156; 379/422

(56) References Cited

U.S. PATENT DOCUMENTS

| | | | | |
|---|---|---|---|---|
| 4,442,055 A | * | 4/1984 | Oelsch et al. | |
| 4,636,593 A | * | 1/1987 | Novak et al. | |
| 5,311,656 A | * | 5/1994 | Eldershaw | |
| 5,514,319 A | * | 5/1996 | Young | 264/132 |
| 5,589,121 A | * | 12/1996 | Inagaki et al. | 264/132 |
| 5,681,515 A | * | 10/1997 | Pratt et al. | 264/153 |
| 5,708,428 A | * | 1/1998 | Phillips | |
| 5,847,336 A | * | 12/1998 | Thornton | |
| 5,909,021 A | * | 6/1999 | Duffy | 200/514 |
| 5,912,083 A | * | 6/1999 | Jimu et al. | |
| 5,960,942 A | * | 10/1999 | Thornton | |
| 6,044,152 A | * | 3/2000 | Mendolia | |
| 6,086,810 A | * | 7/2000 | Inagaki et al. | |
| 6,180,048 B1 | * | 1/2001 | Katori | |

FOREIGN PATENT DOCUMENTS

| | | | |
|---|---|---|---|
| EP | 0 483 898 | * | 5/1992 |
| EP | 0 737 992 | * | 10/1996 |
| EP | 1 017 075 | * | 7/2000 |
| GB | 2 224 602 | * | 5/1990 |
| GB | 2 308 499 | * | 6/1997 |
| JP | 11-329139 | * | 11/1999 |
| KR | 98 005 119 | * | 3/1998 |
| KR | 98 033 432 | * | 7/1998 |
| TW | 304272 | * | 5/1997 |

* cited by examiner

Primary Examiner—Curtis Mayes
(74) Attorney, Agent, or Firm—Fish & Richardson P.C.

(57) ABSTRACT

A keypad for a portable telephone and manufacturing method thereof is disclosed. The method comprises the steps of printing characters on a transparent, planar film; preforming the planar film through a pressing process such that the planar film has a predetermined shape including a plurality of depressions; punching slits in the pressed planar film around the depressions; filling liquid silicone rubber into the depressions of the pressed planar film; forming a keypad by pressing the silicon rubber in a metal mold so as to fabricate an integrated keypad in which keys are interconnected; and trimming an outer periphery of the formed keypad according to a predetermined keypad shape.

2 Claims, 5 Drawing Sheets

KEYPAD FOR PORTABLE TELEPHONE AND MANUFACTURING METHOD THEREOF

BACKGROUND OF THE INVENTION (a) Field of the Invention

The present invention relates to a keypad for a portable telephone and a manufacturing method thereof. More specifically, the present invention relates to a keypad in which film and silicone rubber are integrated in a singlebody structure to manufacture the keypad.

(b) Description of the Related Art

Certain types of electronic equipment such as calculators, telephones or a portable telephone require a means of inputting data. A common structure providing this capability is comprised of a front housing and a keypad, the keypad being assembled into the housing such that buttons, or keys, of the keypad protrude through holes provided in the front housing.

A conventional keypad used in a portable telephone has dome switches which contact a printed circuit board in response to key operation. The conventional keypad may be made of plastics (film type keypad) or silicone rubber (silicone rubber type keypad).

The silicone rubber type keypad is formed by an injection molding process in which silicone rubber is used. After injection molding, characters such as numerals, letters and symbols are printed on an outer surface of the keypad. A drawback of the silicone rubber type keypad is the likelihood that the characters will discolor or rub off after a period of use.

The film type keypad is formed by an injection molding process in which plastics are used. After injection molding, a film on which characters are printed is attached to the keypad. Since characters are printed on an interior surface of the film, they do not discolor or rub off with use. However, because the film type keypad is made of hard plastics, it is not as agreeable to the touch as a keypad made of a pliant material such as silicone rubber.

The inventor of this application disclosed a keypad and method for overcoming the aforementioned problems in Korean Patent Application No. 98-63310 filed on Dec. 31, 1999. In the method of this patent application, after a film, which is pre-formed into a key shape, is coated with epoxy, the film filled with silicone rubber. However, after the epoxy is cured, the epoxy becomes overly hard such that the keys are difficult to operate. It also takes long time to fabricate the keypad.

SUMMARY OF THE INVENTION

In view of the prior art described above, it is an object of the present invention to provide a keypad and a manufacturing method thereof in which a time for fabricating the keypad is minimized by extruding a film and silicone rubber in a single mold.

It is another object of the present invention to provide a keypad and a manufacturing method thereof in which slits are provided around keys to provide enhanced operation feel to the user and prevent keys adjacent to the user-targeted key from being depressed.

To achieve these objects, as embodied and broadly described herein, the invention comprises the steps of printing characters on a transparent, planar film;

preforming the planar film through a pressing process such that the planar film has a predetermined shape including a plurality of depressions;

punching slits in the pressed planar film around the depressions;

filling liquid silicone rubber into the depressions of the pressed planar film;

forming a keypad by pressing the silicon rubber in a metal mold so as to fabricate an integrated keypad in which keys are interconnected; and trimming an outer periphery of the formed keypad according to a predetermined keypad shape.

In the pre-forming process, grooves are formed in the planar film in which light emitting devices are located. It is preferable to use a hot press in the pre-forming process, which is heated to a predetermined temperature such that a uniform film thickness is maintained and a distortion of the characters caused by film expansion is prevented.

Also, to achieve these objects, the present invention provides a keypad for a portable telephone, comprising a printed circuit board having a plurality of contacts; a plurality of dome switches disposed on the printed circuit board; a plurality of keys for pushing the plurality of dome switches; and a plurality of light emitting devices, displaced between the plurality of keys, for backlighting.

In the keypad, grooves are formed between the plurality of keys to enable the placing of the plurality of light emitting devices thereon.

Both foregoing general description and the following Detailed Description are exemplary and are intended to provide further explanation of the invention as claimed.

BRIEF DESCRIPTION OF THE DRAWINGS

The accompanying drawings provide a further understanding of the invention and, together with the Detailed Description, explain the principles of the invention. In the drawings.

DETAILED DESCRIPTION OF THE PREFERRED EMBODIMENTS

The present invention will be described in detail with reference to the accompanying drawings.

Figure 1:
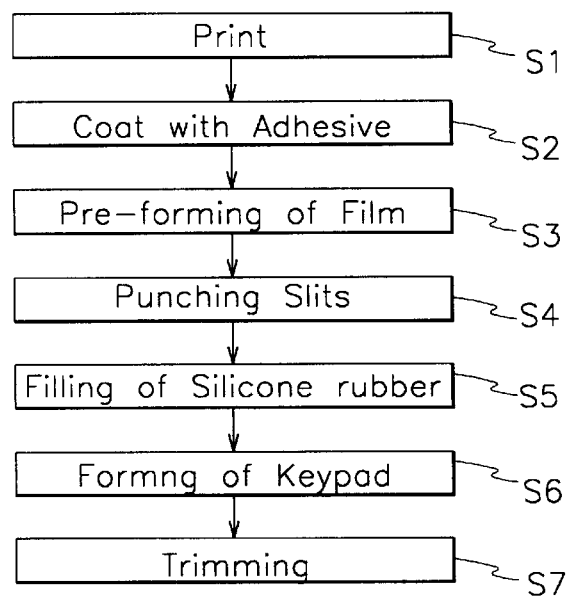
FIG. 1 is a flow chart of a method for manufacturing a keypad for a portable telephone according to a preferred embodiment of the present invention.

Referring to FIG. 1, a method for manufacturing a keypad for portable telephones according to a preferred embodiment of the present invention will be explained.

First, characters such as numerals, letters and symbols are printed on a transparent, planar film in step S1. The characters are printed on a rear side (interior surface) of the planar film in step S1. Accordingly, the user does not directly contact the printed characters, thereby avoiding discoloring and effacing problems.

Next, the rear side of the film is coated with adhesive in step S2 such that silicone rubber can adhere to the rear side of the film in a process to follow. Subsequently, the film is pressed into predetermined key shapes by a press in step S3. This step is referred to as a film pre-forming process and is performed by a hot press which is heated up to a predetermined temperature or by the direct heating of the film. Both these methods allow a uniform film thickness to be maintained and prevent a distortion of the characters due to film expansion. When performing the pre-forming process of step S3, dome-shaped grooves are also formed between keys to enable positioning of light emitting diodes (LEDs) which are used for backlighting.

Following the above step, slits are formed around each key on the film in step S4 in order to avoid difficulty of operation due to the hardness of the film. In particular, two slits are punched around each key, so as to prevent a key(s) adjacent to the user-targeted key from being unintentionally depressed and to improve comfort of operation. That is, a pair of slits are preferably formed at a predetermined length around a circumference of each key such that two noncut portions remain between ends of the slits at each key. Accordingly, each key is not separated from the film and the film maintains a single-body structure. The non-cut portions between the ends of the slits have a predetermined width.

The pre-formed film with the predetermined key shapes is inserted into a first metal mold which has the same shape as the film, then each key is filled with liquid silicone rubber by a filling machine in step S5. In step S5, an amount of the silicone rubber filled in each key is such that the silicone rubber slightly overflows each key (i.e., a volume of the silicone rubber filled in each key is slightly larger than a volume of each key). Following the filling process of step S5, a second metal mold is placed over the first metal mold then pressed, thereby obtaining a completed keypad shape in step S6. This step is referred to as a keypad forming process. Because the volume of silicone rubber in each key is slightly larger than that of each key, silicone rubber is spread between the keys when the second metal mold is pressed onto the first metal mold. Therefore, the keys are interconnected, resulting in a single-body structure with the film. Also, because the film is applied with adhesive in step S2 as described above, the silicone rubber tightly adheres to the film, further enhancing and ensuring the single-body structure with the film.

After the keypad forming process of step S6, the silicone rubber is cured for a predetermined time. After allowing the keypad to cure, trimming or profiling is performed, in which the formed keypad is cut to its final shape in 20 step S7, thereby completing the manufacture of the keypad. In this step, external edges of the keypad are cut and holes needed to fix the keypad to a front housing of a portable telephone are formed. FIGS. 2A–2D are cross-sectional views of a keypad according to a preferred embodiment of the present invention as the keypad undergoes sequential manufacturing processes Referring first to FIG. 2A, characters are printed on a surface 4 of a transparent, planar film 2, the planar film 2 having a thickness of about 0.25–0.5 mm. Next, an adhesive is coated on the printed surface 4 to form an adhesive layer 6.

The film 2 can be made of a synthetic resin such as polycarbonate, or of any material having a predetermined strength and flexibility. It is preferable that the adhesive layer 6 provides good adhesion between the film 2 and silicone rubber, and is coated with a minimum thickness, as long as a predetermined level of adhesion is obtained.

Figure 2A:
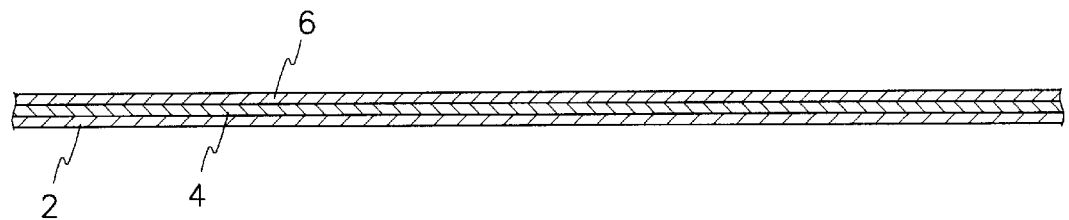
FIGS. 2A–2D are cross-sectional views of a keypad according to a preferred embodiment of the present invention as the keypad undergoes sequential manufacturing processes.
Figure 2B:
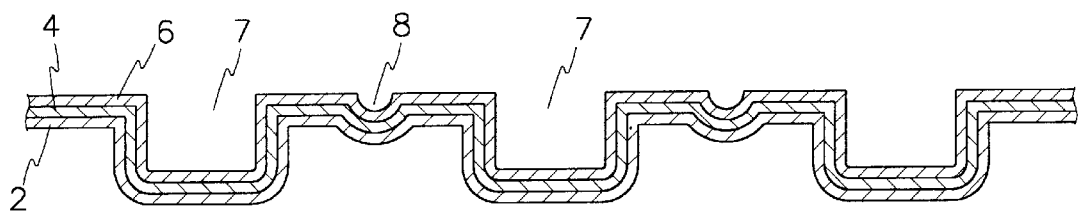

As shown in FIG. 2B, a hot press (not shown), heated to a predetermined temperature, is used to press the film 2, the printed surface 4 and the adhesive layer 6 into a predetermined shape. That is, the film pre-forming process is performed in which the film 2, the printed surface 4 and the adhesive layer 6 are pressed by the hot press such that a plurality of keyshaped depressions 7 are formed.

Also formed during the film pre-forming process are dome-shaped grooves 8. The dome-shaped grooves 8 are formed between the depressions 7, and are used to position LEDs such that back lighting is provided to the keypad. Since the LEDs are at least partially placed on the grooves 8, the amount of space in the portable phone occupied by the LEDs is reduced, resulting in a compact portable telephone.

Figure 2C:
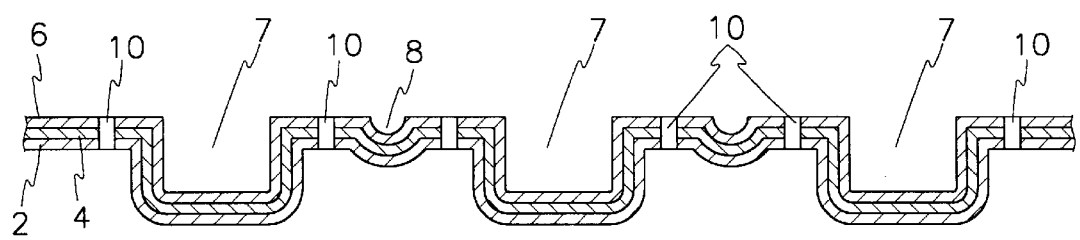

After the pre-forming process is completed, slits 10 are punched around each depression 7 (or key) as shown in FIG. 2C. The slits 10 prevent a key(s) adjacent to a user-targeted key from being unintentionally depressed.

When the slits 10 are formed, two non-cut portions remain between ends of each pair of slits 10 at each depression 7. Accordingly, each depression 7 is not separated from the film 2 and the film 2 maintains a singlebody structure together with the printed surface 4 and the adhesive layer 6. The non-cut portions between the ends of the slits 10 have a predetermined width.

Figure 2D:
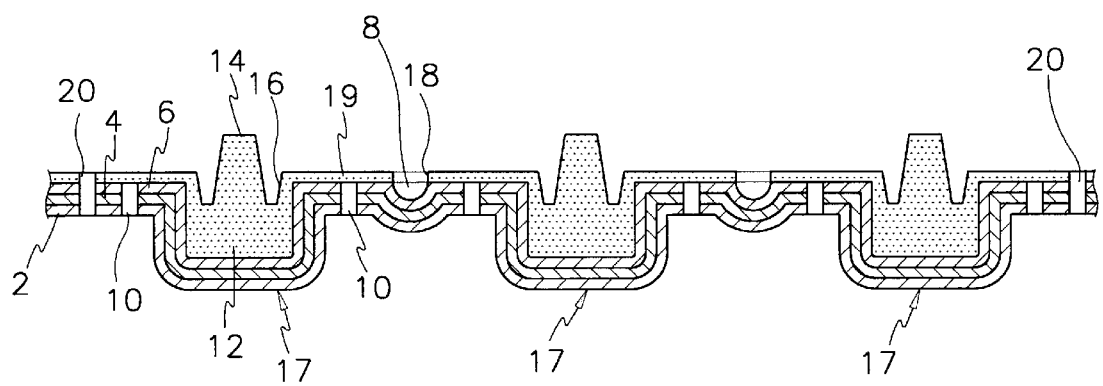

Subsequently, the film 2 is inserted into a first metal mold which has the same shape as the film 2. Next, as shown in FIG. 2D, the depressions 7 are filled with liquid silicone rubber. At this time, an amount of the silicone rubber filled in each depression 7 is such that the silicone rubber slightly overflows each depression 7 (i.e., a volume of the silicone rubber filled in each depression 7 is slightly larger than that a volume of each depression 7.

After the above, a second metal mold is placed over the main metal mold. The second metal mold shapes a rear side of the keypad. By pressing the second metal mold onto the first metal mold, completed keys 17 are formed. Three sides of each key 17 are defined by the depressions 7 of the pre-formed film 2, printed surface 4 and adhesive layer 6; and on the rear side of the keypad, resulting from filling the depressions 7 with silicon rubber and pressing the second metal mold onto the first metal mold, each key 17 comprises an interior 12, a contact projection 14 and a skirt 16. The contact projection 14 extends in a direction opposite the direction the depressions 7 are formed and from a center of each key interior 12. The skirt 16 is formed around a circumference of a proximal end of each contact projection 14. The skirts 16 provide elasticity to each key 17 to enhance operation comfort and to help restore the keys 17 to their original position after they are pushed.

Since the volume of silicone rubber filled in each depression 7 is slightly larger than the volume of each depression 7, the pressing of the second metal mold onto the first metal mold spreads the silicon rubber between depressions 7. Therefore, rubber connecting parts 19 are also formed between the keys 17. Each key 17 is connected through the rubber connecting parts 19, thereby forming an integrated, single-body keypad. Also, holes 18 are formed through the rubber connecting parts 19 at areas corresponding to the grooves 8 of the pre-formed film 2. This allows for the positioning of LEDs on the grooves 8. Finally, outer peripheries of the keypad are cut, and a plurality of fixing holes 20 is formed through both the rubber connecting parts 19 and the film 2 (i.e., the film 2, the printed surface 4 and the adhesive layer 6). The fixing holes 20 are formed at predetermined positions and are used to fix the keypad to a front housing of a portable telephone. Because the film 2 is coated with the adhesive layer 6, the interior 12 of each key 17 and the rubber connecting parts 19 are securely adhered to the film 2. That is, the film 2 is integrated with the silicone rubber such that a single-body structure is obtained. Therefore, it is easy to assemble the keypad to a housing of a portable telephone.

Figure 3A:
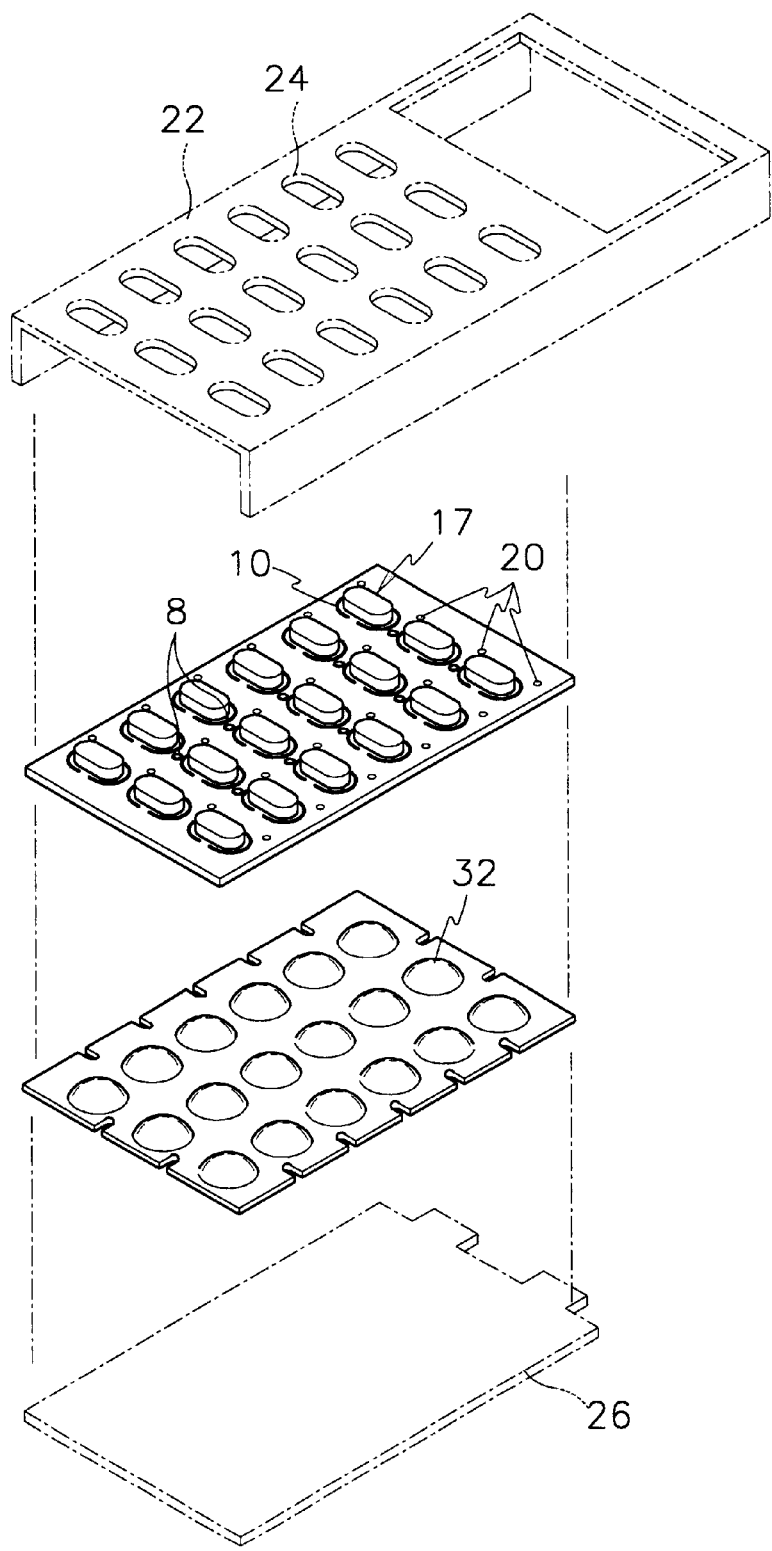
FIGS. 3A–3B are exploded perspective views of the keypad shown in FIG. 2D, a front housing, a dome switch assembly, and a printed circuit board.
Figure 3B:
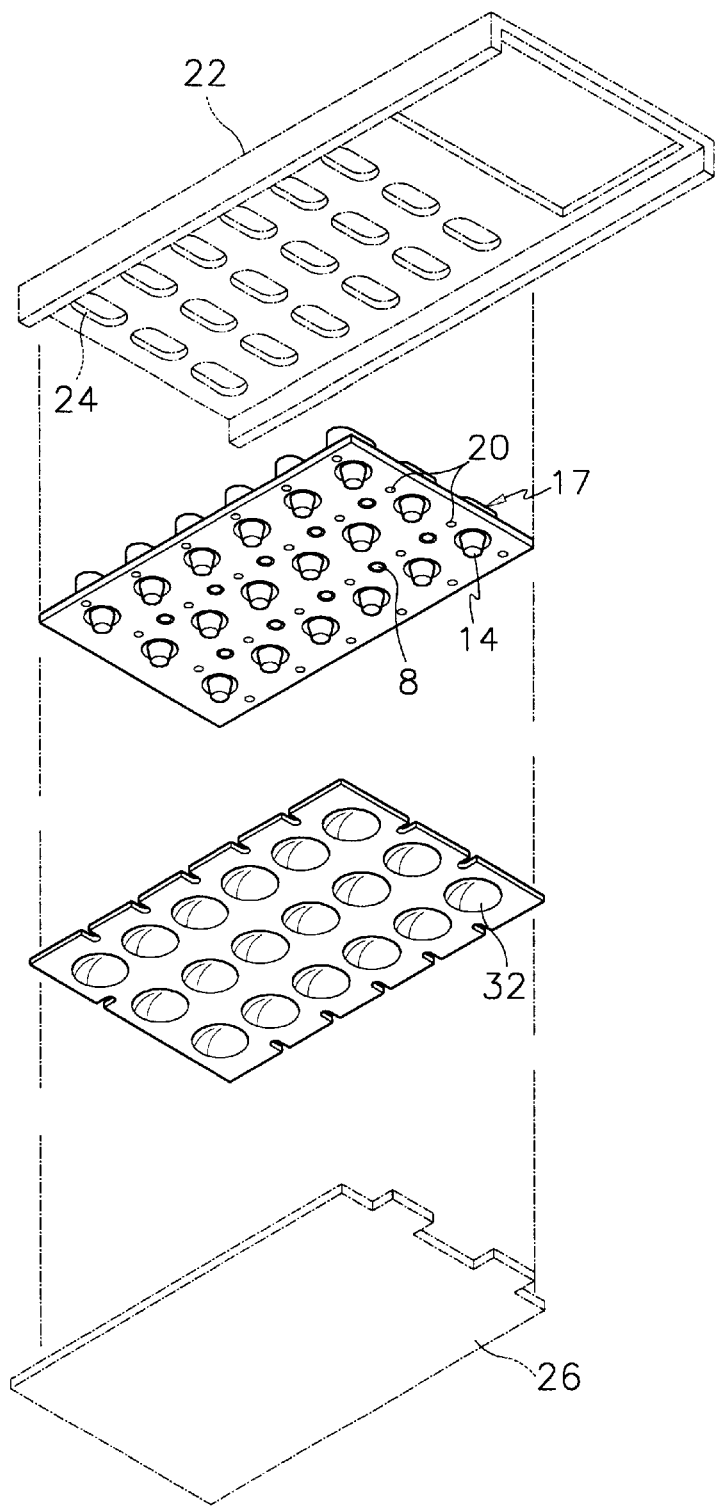
Figure 4:
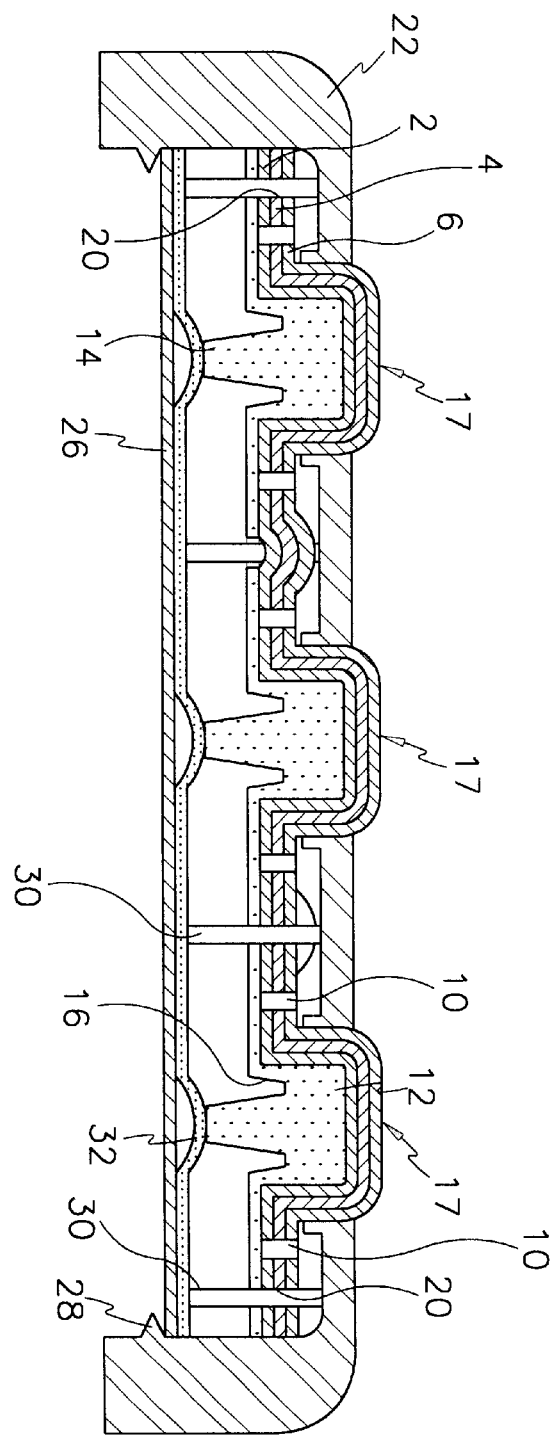
FIG. 4 is a cross-sectional view of the keypad, front housing, dome switch assembly, and printed circuit board shown in FIGS. 3A and 3B in an assembled state.

Referring to FIGS. 3A–3B and 4, the fabricated keypad is assembled into a portable telephone. The keypad is inserted into a front housing 22 of a portable telephone, each key 17 being placed in a corresponding opening 24 formed in the front housing 22.

A printed circuit board 26 is located below the keypad. Further, dome switches 32 are displaced between the printed circuit board 26 and the keypad. Both the printed circuit board 26 and the dome switches 32 are supported by projections 28 formed in the front housing 22 as shown in FIG. 4. Supporting bars 30, integrally formed extending from the front housing 22, also buttress the printed circuit board 26 and the dome switches 32 through the fixing holes 20 of the keypad.

When assembled, the contact projection 14 of each key 17 contacts a corresponding dome switch 32 on the printed circuit board 26. When one of the dome switches 32 is pressed by a corresponding contact projection 14 of the key 17, it contacts a contact point (not shown) on the printed circuit board 26. The dome switches 32 are preferably selected from a material having a predetermined degree of elasticity such that the dome switches 32 can return to their original shape after the user releases pressure on the keys 17.

When the user pushes a key 17, the contact projection 14 presses a dome switch 32, which causes the dome switch 32 to contact the printed circuit board 26 such that a key input signal is generated. When the user stops pushing, the dome switch 32 and key 17 restore to their original positions.

Preferably, the elements of the keypad have suitable strengths and elasticities to enable them to perform their particular functions as described.

It will be apparent to those skilled in the art that various modifications and variations can be made to the device of the present invention without departing from the spirit and scope of the invention. The present invention covers the modifications and variations of this invention provided they come within the scope of the appended claims and their equivalents.

What is claimed is:

1. A method comprising:

printing characters on a film;

applying an adhesive on a rear side of the film;

pressing the film to form a pre-formed film, wherein the pressing is achieved through a pressing process forming a plurality of depressions in the film of a predetermined shape having a concave surface, wherein the adhesive forms an adhesive layer on the concave surface of the plurality of depressions;

punching slits in the pre-formed film around the plurality of depressions;

inserting the pre-formed film into a first metal mold having the same shape as the pre-formed film;

filling liquid silicone rubber into the plurality of depressions of the pre-formed film;

forming a keypad by providing a second metal mold over the first metal mold causing the silicone rubber to overflow from the plurality of depressions, and pressing the silicone rubber such that the silicone rubber and the pre-formed film are united, thereby fabricating an integrated keypad wherein keys are interconnected; and trimming an outer periphery of the formed keypad according to a predetermined keypad shape after curing the silicone rubber.

2. The method of claim 1, wherein the film is a synthetic resin.

* * * * *